US006591019B1

(12) United States Patent
Comair et al.

(10) Patent No.: US 6,591,019 B1
(45) Date of Patent: Jul. 8, 2003

(54) 3D TRANSFORMATION MATRIX COMPRESSION AND DECOMPRESSION

(75) Inventors: Claude Comair, Vancouver (CA); Xin Li, Issaquah, WA (US); Samir Abou-Samra, Vancouver (CA); Robert Champagne, Redmond, WA (US); Sun Tjen Fam, Vancouver (CA); Prasanna Ghali, Vancouver (CA); Jun Pan, Bellevue, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/493,257

(22) Filed: Jan. 28, 2000

Related U.S. Application Data (60) Provisional application No. 60/169,310, filed on Dec. 7, 1999.

(51) Int. Cl.[7] .................................................. G06K 9/36
(52) U.S. Cl. ........................ 382/248; 345/419; 345/473
(58) Field of Search ................................. 382/232–233, 382/235, 248, 166, 176, 237, 243, 298, 244–247, 251, 276, 277; 345/419, 427, 664, 601, 678–679, 473, 586; 341/56, 57, 51–55, 95, 90; 463/43, 32, 33; 717/147; 710/68, 496, 497, 607, 520, 473–474

(56) References Cited

U.S. PATENT DOCUMENTS

| | | | |
|---|---|---|---|
| 4,580,782 A | 4/1986 | Ochi | 463/43 |
| 5,119,442 A | 6/1992 | Brown | 382/235 |
| 5,206,822 A | 4/1993 | Taylor | 708/607 |
| 5,335,299 A | 8/1994 | Atkinson | 382/244 |
| 5,467,110 A | 11/1995 | White et al. | 345/601 |
| 5,579,413 A * | 11/1996 | Bjontegaard | 382/248 |
| 5,583,656 A | 12/1996 | Gandhi et al. | 382/234 |
| 5,778,092 A * | 7/1998 | Macleod et al. | 382/176 |
| 5,781,779 A | 7/1998 | Gilbert et al. | 717/147 |
| 5,864,638 A * | 1/1999 | Ishizawa et al. | 382/232 |
| 5,867,612 A * | 2/1999 | Robson | 382/298 |
| 5,907,297 A | 5/1999 | Cohen et al. | 341/95 |
| 5,990,899 A | 11/1999 | Whitten | 345/427 |
| 5,996,033 A | 11/1999 | Chiu-Hao | 710/68 |
| 6,078,329 A | 6/2000 | Umeki et al. | 395/419 |
| 6,160,558 A | 12/2000 | Motegi | 345/473 |
| 6,334,001 B2 * | 12/2001 | De Queiroz et al. | 382/233 |

OTHER PUBLICATIONS

Lengyel, Compression of Time–Dependent Geometry, 1999, ACM 1999 1–58113–082–1, pp. 89–95.*
International Standard, ISO/IEC 10918–1, First edition, "Information technology—Digital compression and coding of continuous–tone still images: Requirements and guidelines" (Feb. 15, 1994).
Anonymous, "Transform encoding of images involves arranging coefficients for each block into one–dimensional array, and computing and decoding integer" abstract & Research Disclosure, vol. 339, No. 061, Database WPI, Section EI, Week 199233, Derwent Publications (Jul. 10, 1992).

* cited by examiner

*Primary Examiner*—Phuoc Tran
*Assistant Examiner*—Ishrat Sherali
(74) *Attorney, Agent, or Firm*—Nixon & Vanderhye P.C.

(57) ABSTRACT

Compressing and decompressing techniques for transformation matrices 3D computer graphics systems use to animate objects achieve high compression ratios by taking advantage of common characteristics of homogenous 3D transformation matrices. The techniques use a bitmap to encode information on locations of ones and zeros of the matrix—bypassing the penchant of compilers to represent such information as high-precision numbers. Since most video game processors and display hardware are constrained by their resolutions and since an original transformation matrix often stores data that is more accurate than necessary, the techniques convert some real numbers in the matrix (e.g., those within the range of –1 and 1) into integers by scaling them by a constant. The resulting compressed matrices occupy much less storage space than their non-compressed counterparts, and can be efficiently decompressed in real time for use in interactive real time 3D animations.

17 Claims, 5 Drawing Sheets

3D TRANSFORMATION MATRIX COMPRESSION AND DECOMPRESSION

This application claims the benefit of U.S. Provisional Application No. 60/169,310, filed Dec. 7, 1999.

FIELD OF THE INVENTION

The invention relates to computer graphics simulation and animation, and more particularly, to a method and apparatus for efficiently compressing and decompressing 3D transformation data to conserve storage space.

BACKGROUND AND SUMMARY OF THE INVENTION

Many of us have seen films containing remarkably realistic dinosaurs, aliens, animated toys and other fanciful creatures. Such animations are made possible by 3D computer graphics. A computer is used to model objects in three dimensions, and to display them on a computer screen. An artist can completely specify how each object will look as well as how it will change in appearance over time. The computer takes care of performing the many millions of tasks required to make sure that each part of the moving image is colored just right based on distance from the viewer, the direction in which light strikes the object, the object's surface texture, and many other factors.

Because of the complexity of the 3D graphics generation process, just a few years ago computer-generated three-dimensional graphics was mostly limited to expensive specialized flight simulators, graphics workstations or supercomputers. The public saw the results of computer generated 3D graphics in movies and advertisements, but never actually interacted with computer systems doing the graphics generation. All that has changed with the availability of relatively inexpensive 3D graphics platforms such as the Nintendo 64®, the Sony Playstation® and various 3D graphics cards available for personal computers. It is now possible to produce exciting real time interactive 3D animations and simulations interactively in real time on relatively inexpensive computer graphics systems in your home or office.

Good quality computer animations are often based on complicated models with articulated structures and sophisticated motions. For example, such computer simulation and video game three dimensional articulated objects are often modeled as a hierarchical system of N nodes, where each node represents a jointed part of the object (for example, an arm, a leg or a head of a human). Motions such as standing, walking, running, or using a weapon are specified to the articulated system by defining a set of animations represented by sequence of transformations. Because it is computationally intensive to compute such transformations in real time, they are usually computed ahead of time and then stored in the computer graphic systems memory so the system can simply read and use them as needed. When the video game player runs the animation, the computer graphics system reads the precomputed transformations from memory and applies them to change the position, orientation and/or size of the objects on the screen in real time.

Especially in resource-constrained computing environments such as inexpensive home video game and personal computer systems, character animations in three dimensional computer simulations and video games heavily rely on a large number of such precomputed, prestored 3D transformations. For example, a relatively complex animation may contain tens of thousands of pre-constructed transformations. The large memory space required to store the transformation data has become one of major hurdles limiting the complexity of character animations with realistic motions in computer video games. Consider, for example, an animation in which a preconstructed transformation matrix is defined to update each node each frame. As one example, a human body can be modeled using 14 articulated nodes. If 10 animated motions are define for it, each animation takes 2 seconds to finish and the computer generates 30 images per second, the memory space required for storing the transformation data (e.g., in the form of 4x4 real number matrices) would be over one megabyte. A sophisticated application usually has more than one animated characters, which dramatically multiplies the number of matrices and the associated memory space required to store all this transformation data.

It is generally known to use data compression and decompression to reduce the size of computer data. Such compression/decompression relies on redundancy within the data itself. The compression process encodes the data prior to storage. Then, when the data is read from storage, decompression decodes the data and recovers the data in its original form. However, further improvements for efficiently compressing and decompressing transformation matrix data are needed and desirable.

We have developed a compression/decompression technique particularly suited for compressing and decompressing the mathematical descriptions (i.e., 4x4 real number matrices) computer graphics systems use to represent object transformations. The present invention reduces the space complexity required by a transformation matrix by providing an efficient compression algorithm so the transformation data occupies substantially less storage room in computer or video game devices. Although the invention has a special advantage when used for 4x4 arrays for three-dimensional homogenous transformation data in 3D graphics, the general concept is mathematically applicable to any arbitrary MxN matrix.

Briefly, we compress the transformation data off-line and decompress it when loading it from the storage media to the graphics system memory. In accordance with one aspect of a non-limiting exemplary embodiment of the invention, we replace the entire transformation matrix structure with a compact bitmap structure including a small number of bits for each matrix element. Since a homogeneous 3D transformation matrix contains some 0's and 1's, we can eliminate the storage room for those 0's and 1's in the compressed data by using the separate bitmap table to keep information on their locations. The encoding of such 0 and 1 integer values as bit values effectively bypasses the penchant of many compilers to compile all numerical values as double-precision floating point numbers—thus conserving a significant amount of storage space.

In addition, based on the fact that most video game processors and display hardware are constrained by their resolutions and an original transformation matrix often stores data that is more accurate than necessary, we convert some real numbers in the matrix into integers by scaling them by a constant when the compression takes place (integers can typically be stored in one-half to one-quarter the size of floating-point numerical values). One approach is to scale numbers within the range of −1 and 1 so that only some least-significant decimal digits of the numbers will be lost when decompressing the data. In the preferred embodiment, all numbers within the scale range [−1, 1] are processed by their absolute value and a separate table is used to keep the sign of scaled values. In certain circumstances, more than one scale factors can be used for the same set of data to provide different levels of accuracy and save more space. Truncation resulting from this type of floating-to-fixed point conversion may be negligible depending on the resolution of the 3D computer graphics platform.

Exemplary non-limiting embodiments of the present invention thus provides a compression/decompression technique that compensates for the behavior of commonly used compilers (which tend to try to treat all numbers as double precision floating point values unless declared differently) and commonly used programming techniques (which may not declare all numbers and variables appropriately to maximize storage space savings) while also taking advantage of the high incidence of integer 0, integer 1 and fractional signed values commonly found in homogenous 3D transformation matrices commonly used for 3D graphics animation and simulation. While the present invention is particularly adapted for use with such 3D transformation matrices, the techniques of the present invention are useful with any M×N matrix.

BRIEF DESCRIPTION OF THE DRAWINGS

These and other features and advantages provided by the present invention will be better and more completely understood by referring to the following detailed description of preferred embodiments in conjunction with the drawings of which:

FIG. 1 shows an example video game system the preferred embodiment's matrix compression and decompression invention can be used in conjunction with;

DETAILED DESCRIPTION OF PRESENTLY PREFERRED EXAMPLE EMBODIMENTS

Figure 1:
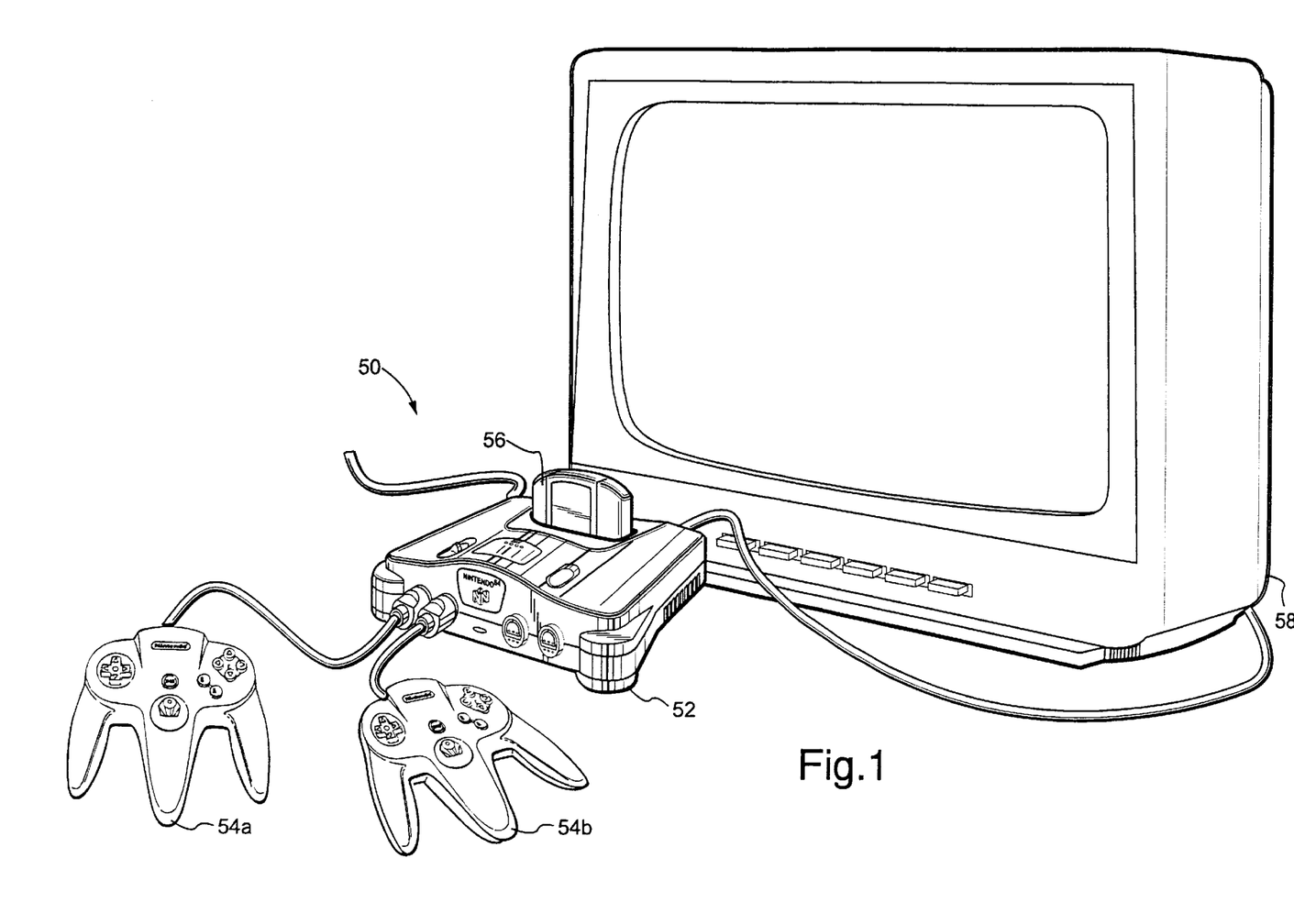

FIG. 1 shows an example real time 3-D computer graphics display system 50 that may be used to provide realistic interactive real time 3D animation and simulation using transformation matrix compression/decompression in accordance with the present invention. The FIG. 1 example system 50 includes a NINTENDO 64® 3-D video game console 52 and associated hand controllers 54a, 54b. A cartridge 56, optical disk or other storage medium storing a software animation or simulation (e.g., video game) program is operatively connected to console 52. The console 52 is connected to a display device 58 such as a conventional home color television set or computer monitor. Console 52 includes a 3D graphics engine that can render 3D animation on display 58 in real time response to user manipulation of controllers 54a, 54b. The software within cartridge 56 controls console 52 to display a sequence of animated video frames on display 58. Human players may operate hand controllers 54a, 54b to cause, under control of software within game cartridge 56, game characters to access pre-stored compressed transformation matrices, decompress the matrices, and use the decompressed matrices to generate images on display 58 interactively in real time.

Figures 2, 2A:
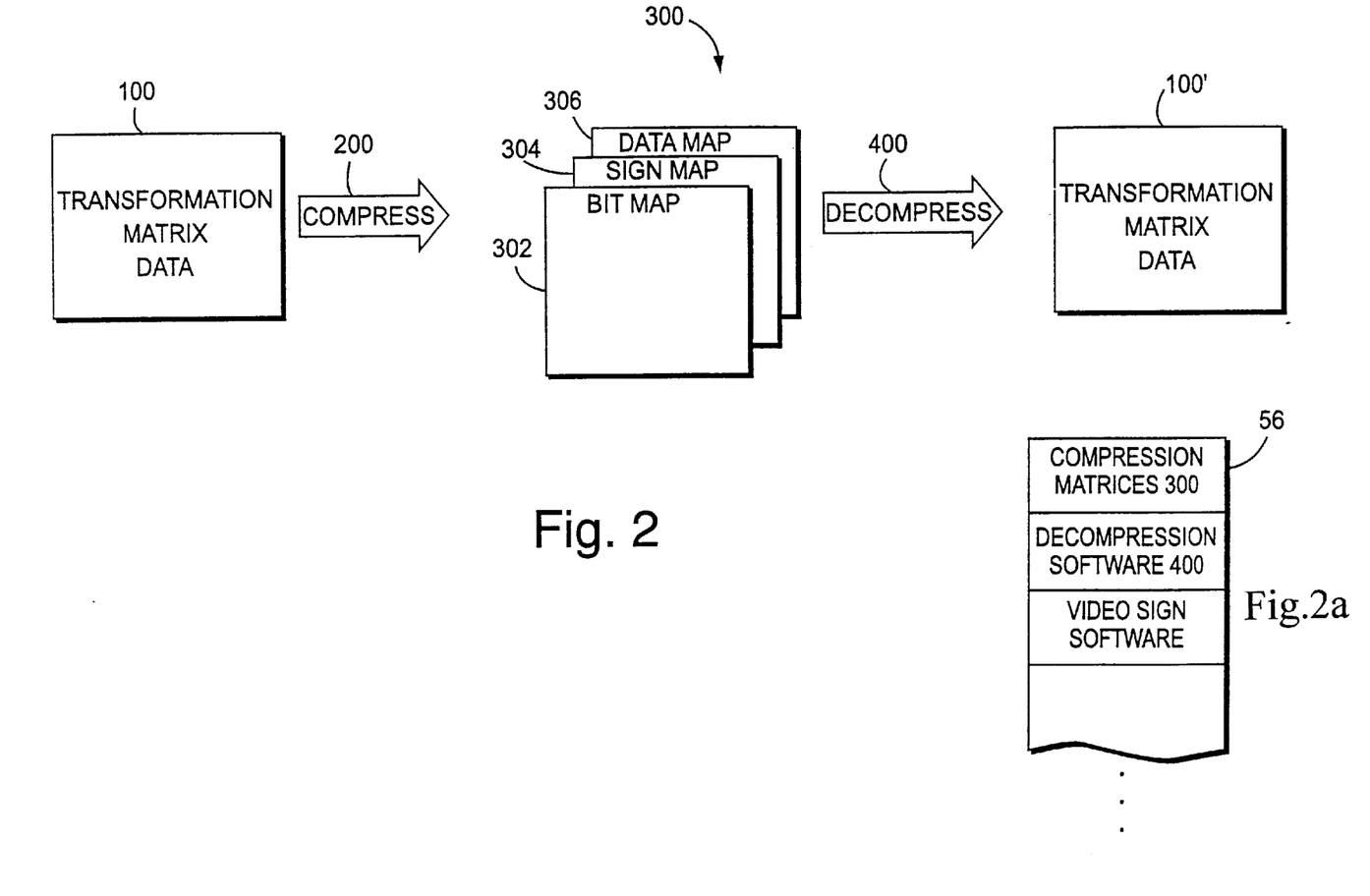
FIG. 2 shows an example overall compression and decompression process provided by a preferred embodiment of the invention.
FIG. 2A shows example storage medium contents.

FIG. 2 shows that the preferred embodiment of our invention performs a compression process 200 to compresses source transformation data 100 off-line to provide compressed data 300 that may be stored within storage medium 56, for example. Such a compression process 200 may be performed, for example, by a special tool that is part of an animation suite, prior to compilation. The resulting compressed data 300 may be stored within storage medium 56 along with decompression software 400, interactive video game software, and code for execution by system 50 (see FIG. 2A).

The preferred embodiment of our invention also provides a corresponding decompression process 400 to decompress the compressed data 300 on an as-needed basis in real time when loading it from the storage media 56 to the CPU memory of console 52 for generation of animated/simulation images. Preferred embodiment decompression process 400 recovers transformation data 100 in the form of a reconstructed matrix 100' that may exactly match (e.g., except for truncation of certain values, as explained below) source transformation matrix data 100. Decompression process 400 in the preferred embodiment is sufficiently efficient and fast that it may be used "on the fly" to decompress and recover transformation matrices 100' on an as-needed basis for use in real time interactive simulations and animations.

As shown in FIG. 2, the compressed data 300 produced by the preferred embodiment comprises three tables:

a bitMap table 302, a signMap table 304, and a dataMap table 306.

The usage of these various tables 302, 304, 306 n the preferred embodiment is as follows:

bitMap table 302 includes an element corresponding to each element of transformation matrix 100, and classifies each such matrix element by general type (e.g., an integer 1, an integer 0, an element whose absolute value is greater than 1.0, or an element whose absolute value is less than or equal to 1.0);

signMap table 304 indicates the sign of each element in matrix 100; and dataMap 206 includes scaled or unscaled absolute values for those elements of matrix 100 that are not integer 1 or integer 0.

Example Compression Process

Figure 3:
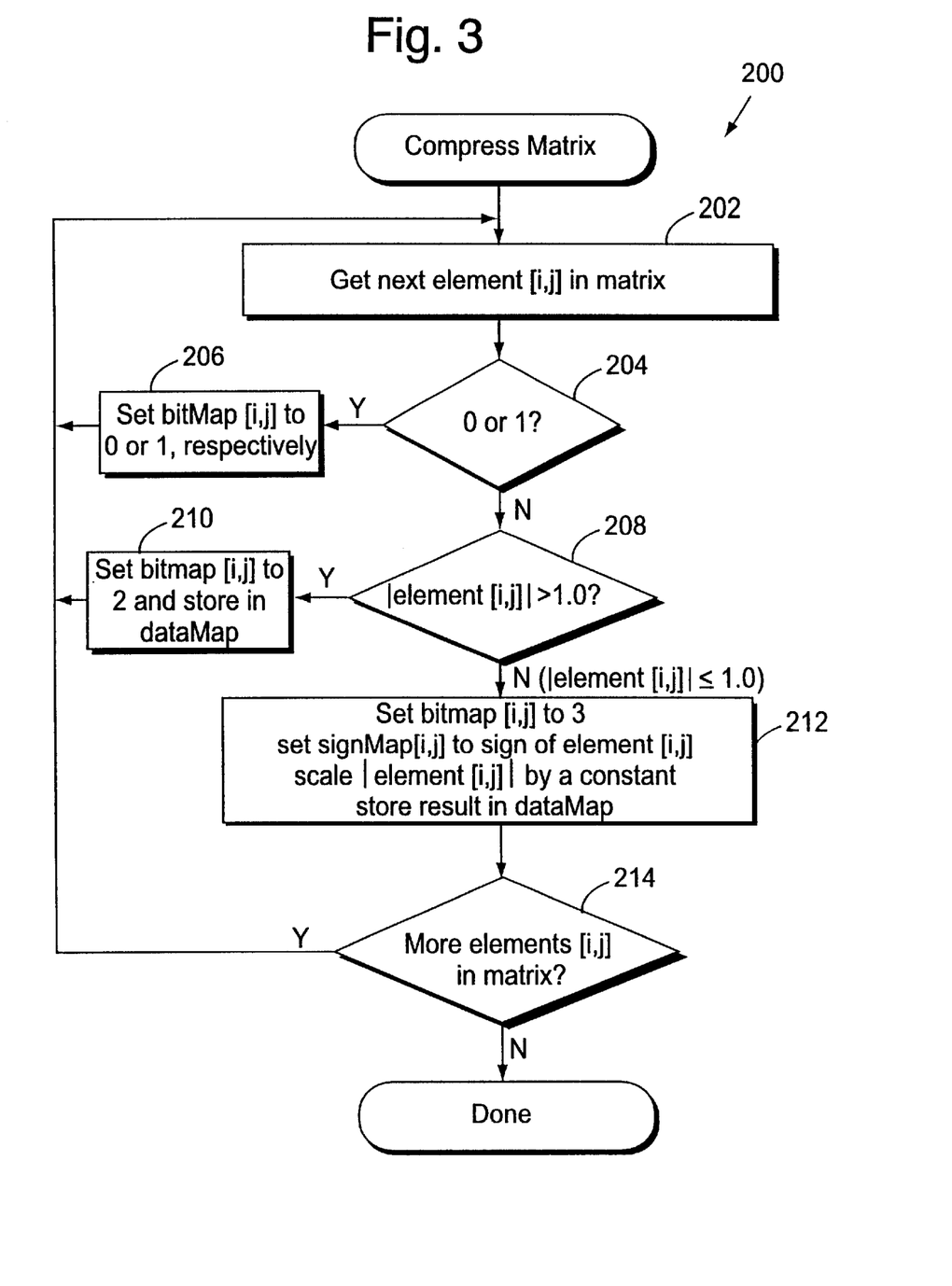
FIG. 3 is a flowchart of an example compression process.

FIG. 3 is a flowchart of compression process 200 provided by the preferred embodiment. Generally, compression process 200 is done in two steps:

1) elimination of 0 and 1 integer values (blocks 204, 206); and

2.) truncation/scaling of certain non-integer values (blocks 208, 212).

Figure 4:
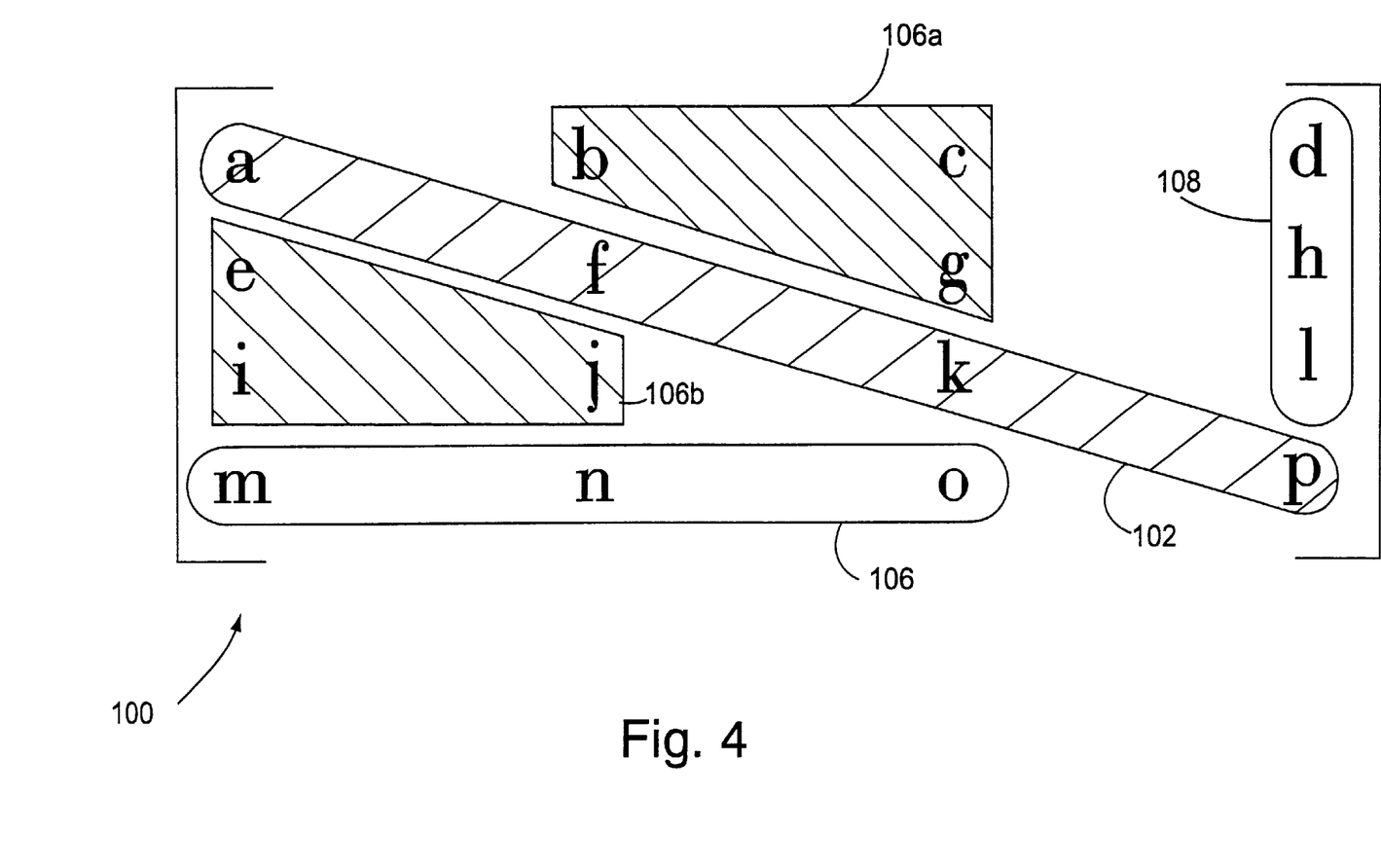
FIG. 4 schematically illustrates an example transformation matrix.

To better understand this compression process 200, reference is made to the FIG. 4 schematic illustration of an example generalized homogenous 4-x-4 3D transformation matrix 100. Some general observations can be made about the 16 values of such a matrix 100:

elements a f, k and p (shaded portion 102) typically relate to a scale factor and may be integer 1 values if no scaling is used (it is often the case that an object is not being made larger or smaller from one animation frame to the next) or floating point values of greater or less than 1 if scaling is being applied;

elements m, n and o (portion 104) typically each have zero integer values for a homogenous transformation;

elements b, c and g (portion 106a) and e, i and j (portion 106b) generally relate to rotation values, and usually have floating point values less than 1 because they encode sine/cosine functions; and elements d, h and 1 (portion 108) typically relate to translation in x, y and z directions, and often take on integer values of 1 or greater.

Since a homogeneous transformation matrix generally contains some 0's and 1's, we can eliminate the storage room for those 0's and 1's in the compressed data and instead using the more compact bitMap table 302 to keep information on their locations. In the preferred embodiment, for an M×N matrix, the bitMap table 302 has the same dimension as source matrix 100, but with each element in the table occupying only 2 bits to represent four different combinations:

| value in bitMap[i, j] | value in original matrix[i, j] |
|---|---|
| 0 | 0 |
| 1 | 1 |
| 2 | other type value |
| 3 | other type value |

The use of a bitMap table 302 by itself as described above results in a significant amount of data compression. However, note that using two-bit entries within bitMap table 302 provides for four different possible values for each entry in bitMap table 302. The ability to encode two categories beyond integer 0 and integer 1 provides a further encoding opportunity the preferred embodiment of this invention takes advantage to provide an additional level of compression encoding. In particular, the preferred embodiment uses the two other value possibilities within bitMap table 302 to encode whether the corresponding matrix element 100 is encoded as a scaled integer or as a floating point number:

| value in bitMap[i, j] | value in original matrix[i, j] |
|---|---|
| 0 | 0 |
| 1 | 1 |
| 2 | stored in dataMap table |
| 3 | scaled and stored in dataMap table |

In more detail, based on the fact that most processors and display hardware of video games are constrained by their resolutions and an original transformation matrix often stores data that is more accurate than necessary, we convert some real numbers in the matrix into integers by scaling them by a constant when the compression is taken place (as those skilled in the art understand, integer values can typically be represented more compactly than floating point numbers e.g., 2 bytes as opposed to 4 or 8 bytes). One approach is to scale numbers within the range of −1 and +1 so that only some least-significant decimal digits of the numbers will be lost when decompressing the data. In the preferred embodiment, all numbers within the scale range [−1, 1] are processed by their absolute value, and the signMap table 304 is used to keep the sign of scaled values. The signMap table 304 has the same dimension of the original matrix with each element in the table only using 1 bit, where 1 represents "negative" and 0 "positive".

As shown in FIG. 3, the compression process 200 of the preferred embodiment is simple and efficient. For each element [i,j] in the original matrix (blocks 202, 214), if the element is 0 or 1 (as tested for by decision block 204), compression process 200 sets bitMap[i,j] to 0 or 1 respectively (block 206). If the absolute value is large than 1.0 (as tested for by decision block 208), then process 200 sets bitMap[i,j] to 2 and stores it in dataMap in a sequential order (block 210) (if desired, this step may also save the sign of the value in a corresponding position within signMap 304, although storing the value as a floating point number within dataMap 306 will typically preserve the sign of the value). Otherwise ("No" exit to decision block 208), process 200 sets bitMap[i,j] to 3, sets signMap[i,j] to represent its sign, scales its absolute value by a constant and then stores the result in dataMap at the next available slot (block 212).

The scaling factor that the preferred embodiment applies to matrix elements whose absolute values are not greater than 1.0 is a constant and is normally set to $2^k$. If k=16, a scaled value can be stored in a 2-byte integer. If k=8, it can be stored in a 1-byte integer. Of course, the smaller k is, the less accuracy the algorithm preserves. In certain circumstances, more than one scale factor can be used for the same set of data to provide different levels of accuracy and save more space. In this case, the bitMmap table 302 can be extended to use more than 2 bits per element to indicate which factor is applied to a particular element in the matrix 100.

Example Decompression Process

Figure 5:
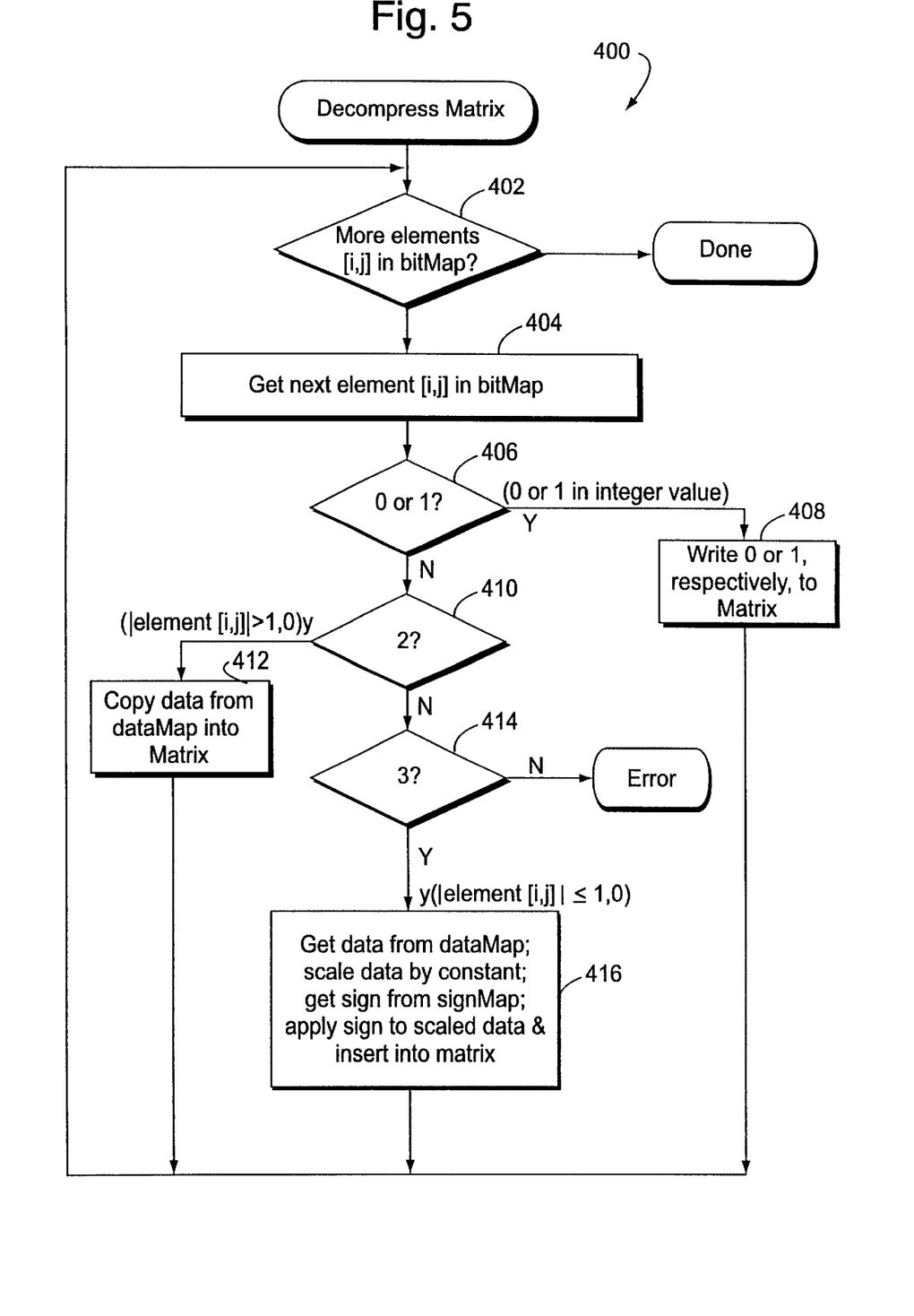
FIG. 5 is a flowchart of an example decompression process.

FIG. 5 shows an example decompression process 400— which is generally the opposite of compression process 200. In this example, each of the elements of bitMap 302 is tested to determine whether it is "1" or "0" indicating an integer "1" or "0" value should be written to the reconstructed matrix 100' (blocks 406, 408). If a bitMap 302 element is "2" indicating the corresponding matrix element absolute value exceeds 1 (decision block 410), process 400 writes the corresponding dataMap 206 value to reconstructed matrix 100' (if desired, adding an appropriate sign from signMap 304) (block 412). If a bitMap 302 element is "3" (indicating the element absolute value is less than or equal to 1 and thus may be scaled) (decision block 414), process 400 gets the associated data from dataMap 206, rescales the data by a corresponding constant, gets the sign of the data from dataMap 304, and writes the reconstructed value to matrix 100' (block 416).

Mathematical Representation

The following is a mathematical description of the above compression/decompression processes 200, 400. Let's assume that an arbitrary M×N real number array A is defined by $$A = \{a_{ij} \mid i \in [0, M-1], j \in [0, N-1]\} \quad (E.1)$$

and its compressed version defined by $$A^C = <\text{BitMap, SignMap, DataMap}> \quad (E.2)$$

where $A^c$ consists of a collection of three sets of data items, namely BitMap, SignMap and DataMap. To define a compress algorithm of A is to specify four encoding functions (B, S, F and G) and two decoding functions ($F^{-1}$ and $G^{-1}$), which map between elements of A and that of $A^c$ such that $A^C$ occupies less space that A originally does.

$$A \xrightarrow{B, S, F, G} A^c, A^c \xrightarrow{F^{-1}, G^{-1}} A' \quad (E.3)$$

(E.3) states that through encoding functions B, S, F and G, A can be uniquely mapped be $A^c$. Similarly, via decoding functions $F^{-1}$ and $G^{-1}$, $A^c$ can be uniquely mapped to A'. If A' is exactly equal to A, then the mapping procedure is called lossless compression. If A' is only an approximation of A, then it is called lossy compression.

Encoding Functions

The data sets in (E.2) and encoding functions in (E.3), which map A to those data sets of $A^c$, are defined as follows:

$$BitMap = \{b_{ij} \mid i \in [0, M-1], j \in [0, N-1]\},$$

$$SignMap = \{s_{ij} \mid i \in [0, M-1], j \in [0, N-1]\}, \text{ and where}$$

$$DataMap = \{d_k \mid k \in [0, (M \times N) - 1]\}$$

$$s_{ij} = S(i, j) = \begin{cases} 0, & a_{ij} \geq 0.0 \\ 1, & \text{otherwise,} \end{cases}$$

$$b_{ij} = B(i, j) = \begin{cases} 0, & a_{ij} = 0.0 \\ 1, & a_{ij} = 1.0 \\ 2, & |a_{ij}| = 1.0 \\ 3, & \text{otherwise,} \end{cases} \text{ where}$$

$$d_k = F(i, j) = \begin{cases} \Phi, & a_{ij} = 0.0 \\ \Phi, & a_{ij} = 1.0 \\ a_{ij}, & |a_{ij}| > 1.0 \\ g_{ij}, & \text{otherwise,} \end{cases}$$

$$g_{ij} = G(i, j) = \begin{cases} int(|a_{ij}| \times C), & 0.0 < |a_{ij}| < 1.0 \\ \Phi, & \text{otherwise} \end{cases}$$

In function F(i,j), $\Phi$ indicates that the value is undefined. In G(i,j), int(a) is an integer function that returns the integer part of its argument a. C is a scaling constant and usually has a value of $2^k$. When k=16, C scales the absolute value of $a_{ij}$ to an integer between 0 and 65,635.

Decoding Functions

Decoding functions in (E.3), which map data sets of $A^c$ to A, are defined as follows:

$$a_{ij} = F^{-1}(i, j) = \begin{cases} 0.0, & b_{ij} = 0 \\ 1.0, & b_{ij} = 1 \\ d_k, & b_{ij} = 2 \\ g_{ij}, & b_{ij} = 3 \end{cases}$$

$$g_{ij} = G^{-1}(i, j) = \begin{cases} d_k/C, & s_{ij} = 0 \\ -d_k/C, & s_{ij} = 1 \end{cases}$$

where C is the same value as defined earlier, which scales the data to between 0 and 1.

EXAMPLE

For a typical transformation maxtri in 3computer graphics:

$$A = \begin{bmatrix} 0.9997 & 0.0032 & 0.0244 & -1.7205 \\ -0.0039 & 0.9996 & 0.0291 & 59.7718 \\ -0.0243 & -0.0292 & 0.9993 & 62.3249 \\ 0.0 & 0.0 & 0.0 & 1.0 \end{bmatrix}$$

applying the compression algorithm, we obtain:

$$SignMap = \begin{bmatrix} 0 & 0 & 0 & 1 \\ 1 & 0 & 0 & 0 \\ 1 & 1 & 0 & 0 \\ 0 & 0 & 0 & 0 \end{bmatrix} \quad BitMap = \begin{bmatrix} 3 & 3 & 3 & 2 \\ 3 & 3 & 3 & 2 \\ 3 & 3 & 3 & 2 \\ 0 & 0 & 0 & 1 \end{bmatrix}$$

$$DataMap = [65516\ 210\ 1599\ -1.7205\ -256\ 65510\ 1907\ 59.7718\ -1593\ -1914\ 65490\ 62.3249]$$

The following table shows the size of the various tables 302, 304, 306 in the preferred embodiment for an M×N matrix 100:

| Data Sets | number of bytes |
| --- | --- |
| BitMap 302 (bij) | (M × N)/4 bytes |
| SignMap 304 (sij) | (M × N)/8 bytes |
| DataMap 306 (dij) | 4 p + 2 q bytes | where p is the number of elements in BitMap table 302 whose value is equal to 2 and q is the number of elements in the BitMap table whose value is 3. (Assuming the scaling factor is $2^{16}$=65,536). Since the numbers of 2's and 3's in BitMap are 3 and 9 respectively, the totally occupied bytes in this example is 16/4+16/8+3×4+9×2=36 bytes. Compared with the original size of 64 bytes, the compression ratio is 43:75%.

ALTERNATIVE EMBODIMENT

As discussed above, dataMap 306 of the preferred embodiment may store a combination of integer values and floating point numerical values. An alternative embodiment of the present invention eliminates this mixture of integer and non-integer values by dividing dataMap 306 into two separate tables (one for integers, and the other for non-integers). This alternate embodiment would allow a compiler to compile one table as integer values, and the other table as non-integer (e.g., single or double precision floating point) values.

A still further embodiment tests the range of values within matrices 100 for a particular animation or simulation. If this testing determines that no matrix 100 uses or requires an integer greater than a certain value, then the integers stored within dataMap 306 can be represented using lower precision values (e.g., a 1-byte "short" integer rather than a 2-byte "long" integer value). Such a technique may, under certain conditions, be useful to further increase the compression ratios that are obtainable.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method of encoding a homogeneous real number 3D transformation matrix mathematically representing a transformation for transforming at least one of the position, orientation and size of a 3D object for graphical display, said method comprising:

parsing said homogeneous 3D transformation matrix to locate any integer "1" and "0" values;

generating a first data structure having elements corresponding to said transformation matrix, said first data structure encoding at least said integer "1" and "0" values within said matrix with compact bitmap value representations; and generating at least a second, additional data structure that contains real number values within said transformation matrix other than "1" and "0" integer values with datamap and signamap value representations.

2. A method as in claim 1 wherein at least some of said second data structure values are scaled.

3. A method of decoding a homogeneous real number 3D transformation matrix mathematically representing a transformation for transforming at least one of the position, orientation and size of a 3D object for graphical display, said method comprising:

reading a first data structure encoding said integer "1" and "0" values within said matrix with compact bitmap representations to determine which values of said matrix are integer "1" and "0";

reading at least a second data structure that supplies real number matrix values other than integer "1" and "0" matrix values; with datamap and signmap value representations;

reconstructing said 3D transformation matrix by specifying, based on said determination, which of said matrix values are integer "1" and "0" and by specifying said supplied numerical matrix values for the matrix values other than integer "1" and "0"; and using said reconstructed 3D transformation matrix to transform at least one of the position, orientation and size of said 3D object.

4. A method as in claim 3 wherein at least some of said second data structure real number matrix values are scaled.

5. The method of claim 1 further including compiling a video game program including said first and second data structures, and wherein said compact bit value representation use prevents said compiling step from compiling said first data structure as double-precision floating point numbers.

6. The method of claim 1 wherein said second data structure generating step includes scaling at least some of said real number transformation matrix values by a constant.

7. The method as in claim 6 wherein said scaling comprises scaling real numbers within the range of −1 and 1 so that only some least-significant decimal digits of said numbers are lost during subsequent decompression.

8. The method of claim 1 further including generating a third data structure providing sign information, and wherein said second data structure generating step generates absolute values of said real number transformation matrix values.

9. The method of claim 1 wherein said second data structure generating step includes applying a plurality of scale factors to provide different levels of accuracy.

10. The method of claim 1 wherein said second data structure generating step includes performing a floating to fixed point conversion for at least some of said real number transformation matrix values.

11. The method of claim 1 wherein said first data structure generating step represents each of said integer values with a pair of bits representing whether the value is: (a) an integer 0, (b) an integer 1, (c) stored in said second data structure, or (d) scaled and stored in said second data structure.

12. The method of claim 3 wherein said reconstructing step includes processing said second data structure real number transformation matrix values as being scaled by a constant.

13. The method as in claim 12 wherein said processing step includes processing scaled real numbers within the range of −1 and 1 so that only some least-significant decimal digits of aid numbers are lost.

14. The method of claim 3 further including reading a third data structure providing sign information, and wherein said second data structure represents said real number transformation matrix values as absolute values.

15. The method of claim 3 wherein said second data structure represents said matrix values as scaled by a plurality of scale factors to provide different levels of accuracy.

16. The method of claim 3 wherein said second data structure represents at least some floating point values as fixed point values.

17. The method of claim 3 wherein said first data structure represents each of said integer values with a pair of bits representing whether the value is: (a) an integer 0, (b) an integer 1, (c) stored in said second data structure, or (d) scaled and stored in said second data structure.

* * * * *